INVENTOR.
JAMES F. WEHDE

BY Williamson, Palmatier, & Bains
ATTORNEYS

Sept. 24, 1968   J. F. WEHDE   3,402,832
BALE ACCUMULATOR
Filed Aug. 15, 1966   3 Sheets-Sheet 2
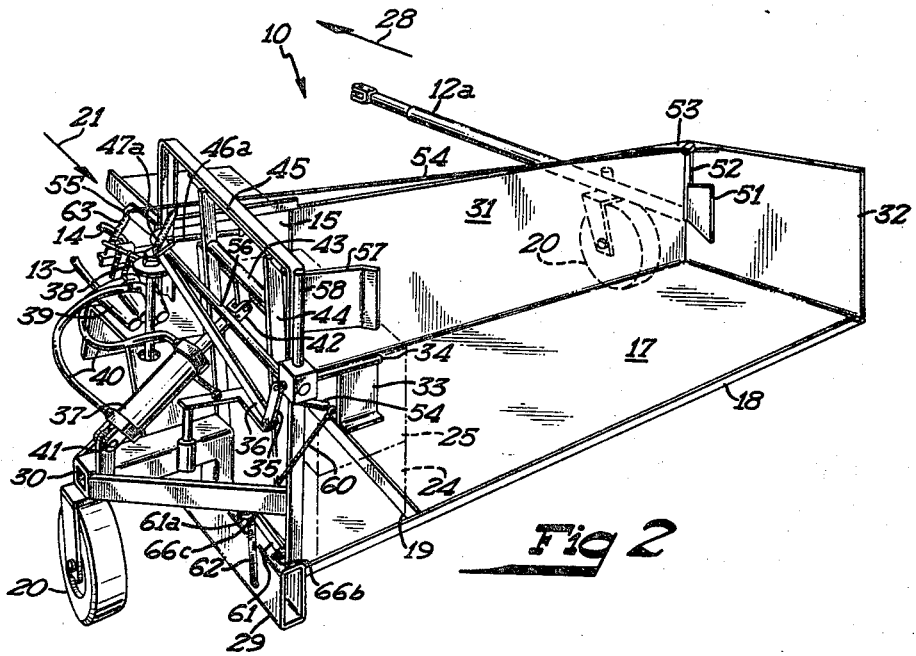
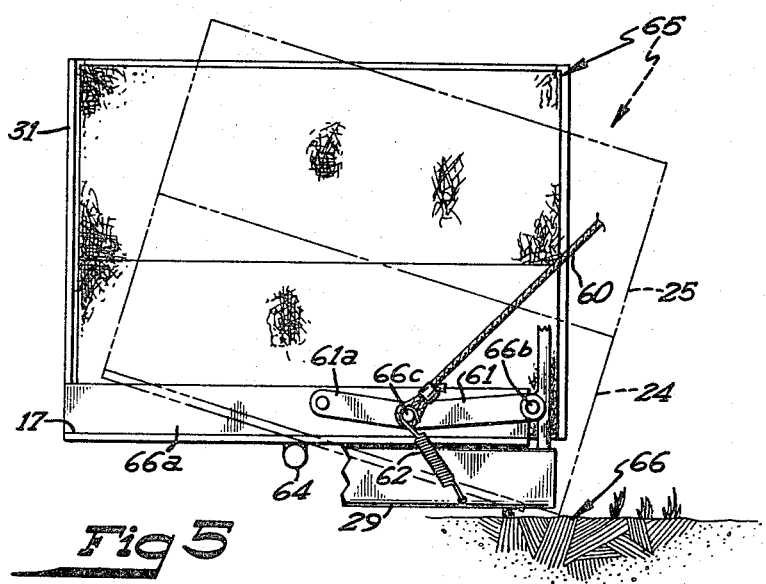
INVENTOR.
JAMES F. WEHDE
BY Williamson, Palmatier
& Bains   ATTORNEYS Sept. 24, 1968  J. F. WEHDE  3,402,832
BALE ACCUMULATOR
Filed Aug. 15, 1966  3 Sheets-Sheet 3

INVENTOR.
JAMES F. WEHDE
BY Williamson, Palmatier
& Bains   ATTORNEYS

United States Patent Office 3,402,832
Patented Sept. 24, 1968

3,402,832
BALE ACCUMULATOR
James F. Wehde, Garretson, S. Dak. 57030
Filed Aug. 15, 1966, Ser. No. 572,391
6 Claims. (Cl. 214—6)

This invention relates to a bale accumulator and more particularly relates to a bale accumulator which is adapted to receive bales from a baler, stack the bales and dispense the stacked bales for subsequent lifting and loading of the stack for transport.

An object of this invention is to provide a bale accumulator which receives bales from a baler, stacks the bales in stacks having a predetermined number of bales and dispenses the bales when the predetermined number of bales has been accumulated and stacked.

Another object of my invention is the provision of an accumulator which is conveniently towed by a tractor behind a baler or towed by a self-propelled baler and automatically arranges the bales in a stable predetermined group or stack whereby the bales may be readily lifted to a transport vehicle for shipment.

Still another object of my invention is the provision of a new and improved bale accumulator of simple and inexpensive construction and operation.

A further object of my invention is the provision of an improved bale accumulator which accumulates bales into a relatively stable stack for lifting and shipping and which is extremely simple in its operation and permits operation by a person of minimum skill or manual dexterity.

These and other objects and advantages of my invention will more fully appear from the following description made in connection with the accompanying drawings wherein like reference characters refer to the same or similar parts throughout the several views, and in which:

FIG. 2 is a perspective view of my invention as viewed from the rear.

FIG. 5 is a schematic side elevation of the bale dispensing mechanism.

Figure 1:
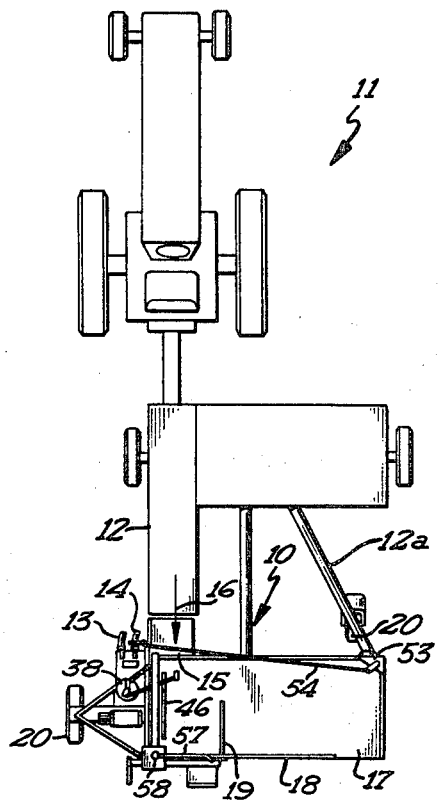
FIG. 1 is a diagrammatic sketch showing a typical usage of my invention in plan view.

One form of the present invention is shown in the drawings and is described herein.

Referring to FIG. 1, my accumulator is indicated by numeral 10 and is drawn by tractor 11 which tows baler 12 intermediate tractor 11 and accumulator 10. A suitable drawbar 12a joins baler 12 and accumulator 10. A hydraulic take-off is provided from tractor 11 to accumulator 10, the details of which are not shown here. The hydraulic system enters accumulator controls through hydraulic hoses 13 and 14, respectively. Bales enter the accumulator through the opening 15 in the direction indicated by the arrow 16. The bales are stacked on load carrying bed 17 and are retained thereon by rib 18 on the trailing edge of bed 17. A guide bar 19 is shown to position the bales in a predetermined location on bed 17 as they are received.

Referring to FIG. 2, my accumulator is shown mounted on suitable support wheels 20. Bales enter my accumulator in the direction indicated by arrow 21, entering the accumulator at opening 15 onto receiving bed 17. A lower bale is shown, having entered opening 15 and disposed on bed 17, indicated by numeral 24 and shown in dotted lines for clarity. A second bale, 25, is shown disposed on bale 24, and shown in dotted lines for clarity. Bale 24 enters opening 15 and drops to bed 17, whereas bale 25 enters through opening 15 and slides over bale 24 to the position indicated in FIG. 2. The guide rail 19 is a rigid member, typically steel, welded to the metal bed 17. Guide 19 is positioned to allow bale 24 to easily be pushed sideways thereover into a position alongside the guide rail. Bale retaining rib 18 is indicated mounted transversely to the direction of travel of the accumulator and at the trailing edge of bed 17. Rib 18 retains bales on bed 17 during the forward motion of the accumulator 10. Bales 24 and 25 are positioned on bed 17 with the longitudinal axis of the bale disposed in the direction of travel of the accumulator. The direction of travel of the accumulator is indicated by arrow 28. It should be noted that bed 17 is positioned on supporting framework 29 and other suitable supporting framework which is not shown in the drawing. Wheel member 20 is supported by suitable framework 30 which is mounted on frame member 29. An upright wall 31 extends from load carrying bed 17 and is adapted to engage the ends of the bales, transversely to the direction of travel of accumulator 10. A side plate 32 projects upwardly from bed 17 disposed generally in the direction of travel of the accumulator and defines and retains the load carried by the accumulator.

After bale 24 is delivered, bale 25 enters, and is disposed, on bale 24. Bale 25 engages lever 33, rotating it about axis 34 which is operably connected to lever arm 35. Linkage arm 36 actuates hydraulic ram 37 through overcenter wheel 38 which, in turn, actuates hydraulic control unit 39 which is operably connected to ram 37 through hydraulic hoses 40. Hydraulic fluid enters ram 37, actuating ram 37 whereby bales 24 and 25 are moved sideways, transversely to the direction of travel of the accumulator, retaining the longitudinal axis of the bales generally parallel with the direction of travel of accumulator 10. Bales 24 and 25 are moved sideways over guide rail 19 into a position a bale's width from the position indicated by the dotted lines of bales 24 and 25 in FIG. 2. Hydraulic ram 37 is pivoted on frame member 30 at a pivot point indicated by numeral 41. The ram clevis 42 is pivotally mounted on cross member 43 which in turn is mounted on a pair of link arms 44 which are adapted to rotate about an axis 45. Axis 45 is substantially parallel to the direction of travel of accumulator 10. A bale push plate 46 is mounted on upright members 44 and is adapted to engage bales 24 and 25 to move them sideways, transverse to the direction of travel of the accumulator 10, to a position a bale's width from the position shown by the dotted lines.

Figure 4:
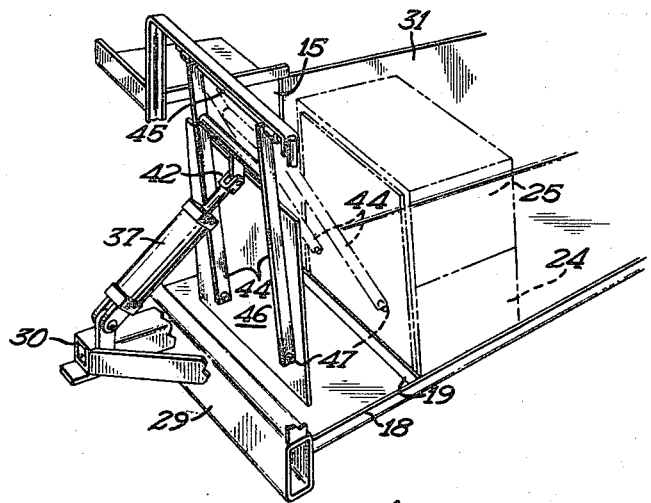
FIG. 4 is a partial perspective view of my accumulator showing the bale positioning assembly.

Referring to FIG. 4, ram 37 is shown supporting plate 46 in position to receive bales (in the solid lines), and in position having moved bales a bale's width sideways (in the dotted lines). Arms 44 are pivotally mounted to plate 46 at pivot points 47. The support shaft 45 is shown mounted on suitable framework. The clevis 42 is shown in position with bale engaging plate 46 upright to receive bales through opening 15. When the upper bale actuates member 33 (shown in FIG. 2), ram 37 is actuated, placing plate 46 in the position shown in the dotted lines thereby urging bales 24 and 25 sideways. It should be noted that the bales 24 and 25 are positioned over guide rail 19 without adversely affecting the alignment of the bales.

Figure 3:
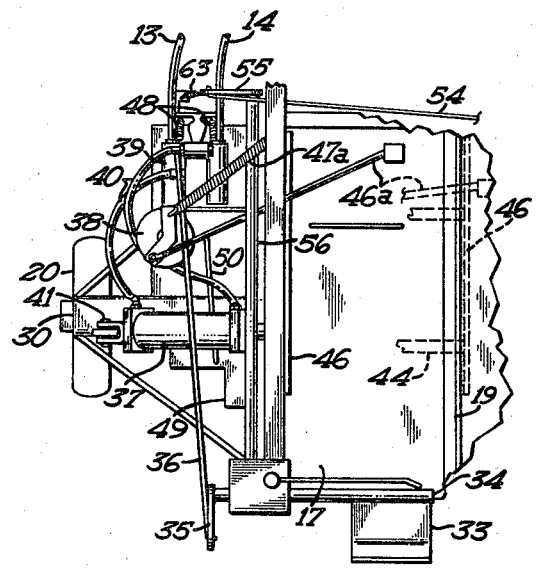
FIG. 3 is a partial plan view of my accumulator.

Referring to FIG. 3, bale engaging plate 46 is shown in position to receive bales. The longitudinal guide rail 19 is shown as is ram 37 which actuates plate 46. Flag member 33 is shown in position to engage an upper bale and rotate on shaft 34 to which link 35 is connected. Linkage arm 36 is shown connecting link 35 with overcenter wheel 38. Over center wheel 38 is shown in position in its rotated condition, having been operated by bale engaging sensor 33. In this position, hydraulic control unit 39 is actuated subsequently extending the ram 37. While the bales are moved to the side, a linkage rod 46a and spring 47a causes wheel 38 to return to its original position. Rod 46a is connected to arm 44, which pulls rod 46a when plate 46 is actuated by the ram. This action causes rod 46a to pull over center wheel 38 to a position to receive the next bale.

After the ram and clevis 42 of cylinder 37 reaches its predetermined extended position, hydraulic control 39 passes through neutral with the aid of off-center springs 48. This places the ram into reverse, allowing fluid to reverse through lines 40, returning the ram to its original position with plate 46 shown by solid lines. Plate 46 is indicated by the dotted lines in its extended position, with a portion of support pushing arms 44 also shown. Rod 46a is also shown in the extended position. When the bale engaging pusher plate 46 is returned to its normal position, arm 49 is actuated which is operably connected with linking rod 50. Rod 50 actuates springs 48, which are connected to hydraulic control cylinders 39, and returns the springs 48 to their equilibrium position thereby causing the control cylinders 39 to return the hydraulic ram 37 to its equilibrium or neutral position, ready to receive another set of bales.

Bales are received in groups of two in the same manner that bales 24 and 25 are received. Subsequent sets of two bales are pushed sideways by pusher plate 46. The action of the bales being pushed by plate 46 against the previous set of bales advances the previous bales a bale's width across bed 17 until a predetermined number of bales have been loaded.

Referring to FIG. 2, in an accumulator designed to accumulate a total of ten bales, the seventh and eighth bales, in their movement sideways, cause a lever 51 to be engaged by the first and second bales. Lever 51 is attached to an upright rod 52 which is pivotally mounted on a substantially horizontal frame 53 attached to upright walls 31 and 32. Lever 51 is operably connected to linking arm 54 which is connected to arm 55 which is connected to a shaft 56. Lever 33 is attached to shaft 56 and, through the action of lever 51 through linkage 54 is caused to rotate downwardly substantially 90° and be replaced by lever 57 which is pivotally attached to shaft 58. The operation of the hydraulic ram and pusher plate is now suspended since the operating lever 33 is disposed away from the incoming ninth and tenth bales. The ninth bale is placed on the bed 17 in the same manner as the preceding bales. However, the tenth bale now engages lever arm 57 which in turn is operably connected to linkage arm 59 through shaft 58. Linkage arm 59 is connected to cable 60 to disengage over-center jointed arms 61 and 61a which are pivotally mounted to lock bed 17 in the over-center relation and release bed 17 when pulled past center by cable 60. Bed 17 tilts with the trailing edge substantially engaging the ground. The trailing edge of the bales engages the ground and they are pulled from the bed in a group of 10 by the action of the high friction of the ground engaging the bales and the minimum friction of the bales on the bed 17. Since the bales have been stacked in a predetermined stable position, the bales are maintained in their tight stack ready to be received into a lifter for subsequent loading onto a truck. The pivot detail of bed 17 is not shown. It is a conventional pivot axis, transverse to the direction of travel of the accumulator, and placed such that when the bed 17 is not loaded the forward portion is heavier and therefore, when empty, returns to its normal position. Spring 62 causes the bed 17 to be locked in the normal position until such time as cable 60 is actuated, releasing jointed arms 61 and 61a. When the bed is loaded, it is heavier at its rear portion and therefore tips rearwardly to discharge a load when links 61 and 61a are actuated.

After the bales have been dumped, spring 63, which was placed in tension by the action of first and second bales against lever arm 51, returns to its equilibrium position thereby pulling lever arm 55 and linkage 54 back to their normal position ready to receive a new series of bales. The action of spring 63 returning lever arm 51 also causes shaft 56 to rotate approximately 90° thereby placing flag 33 in position to receive a new set of bales, and to actuate ram 37 which will push the bales sideways as described above.

Referring to FIG. 5, the action of the tilting bed is shown diagrammatically. Upright wall 31 is shown as is bed 17. The pivot point of the bed 17 is indicated at numeral 64 with the locked over-center jointed arms 61 and 61a also shown with cable 60 attached thereto. Spring 62, which is attached to frame 29 and the joined ends of links 61 and 61a, is shown. The linkage is shown in its normal position to receive bales. The bales 65 are shown in solid lines at rest on the bed and in dotted lines being unloaded. Upon actuation of cable 60, the over-center linkage is released to allow bed 17 to tilt about axis 64 and allow the bales 65 to engage the ground at the point indicated by 66 thereby being pulled from the bed 17 in a group onto the ground.

The link 61a is pivotally attached to the side rail 66a of bed 17. Link 61 is pivotally attached to upright 66b of frame 29. The free ends of links 61 and 61a are pivotally attached at 66c with 60 attached at that point to actuate the release action. Spring 62 is attached to frame 29 and, after release by cable 60, pulls the links 61 and 61a back to the over-center position locking bed 17 in the horizontal position.

Figure 6:
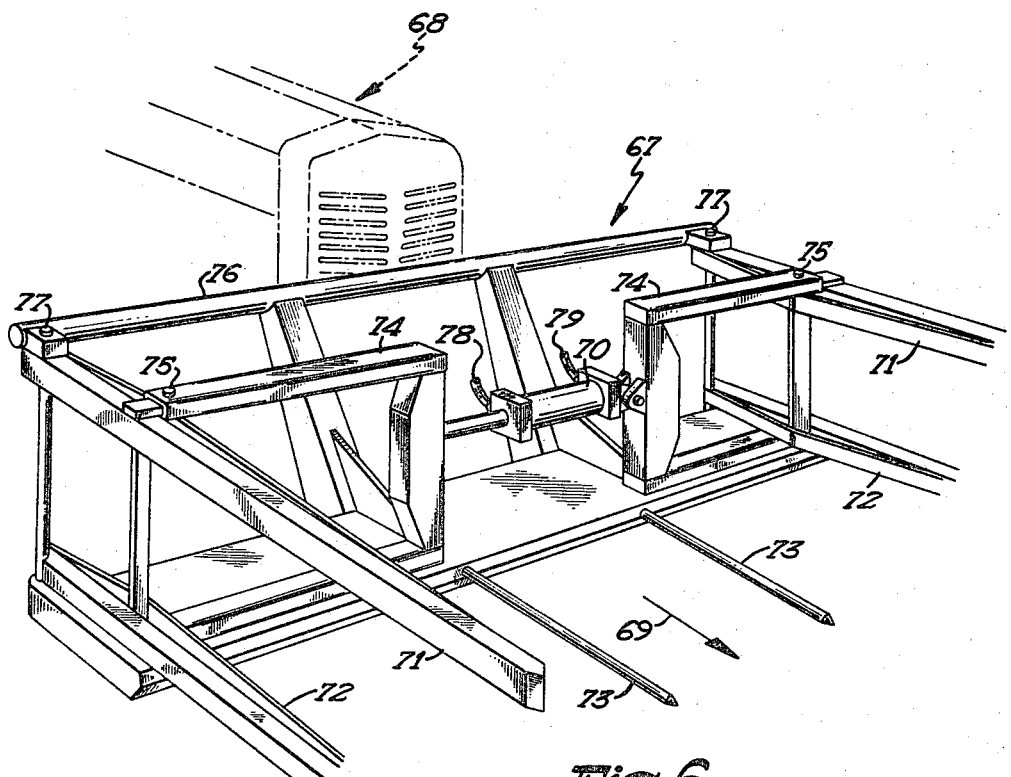
FIG. 6 is a partial perspective view of the bale stack lifting device of my invention.

The stack of bales, five abreast and two high (10 bales), may now be lifted as a group onto a truck by my stack lifting device which works with my accumulator. Referring to FIG. 6, my lifting device 67 is shown attached to the front portion of tractor 68. It should be noted that the lifter is pushed forwardly of the tractor in the direction indicated by arrow 69, whereas my accumulator is towed behind a tractor. Hydraulic cylinder 70 is powered by the hydraulic take-off from tractor 68, and is responsive to controls on tractor 68. Hydraulic cylinder 70 actuates a pair of opposed parallel upper arms 71 which extend forwardly of tractor 68 and are spaced apart a predetermined distance to correspond with the width of the bale stack. A pair of lower arms 72 are opposed and parallel and spaced apart a predetermined distance. Arms 71 and 72 are separated to correspond to the height of the bale stack. Of course, my accumulator may be designed to stack wider and higher, however, I have found that stacking five abreast and two high provides a relatively stable stack suitable for lifting and other handling. Rods 73 extend forwardly and are parallel and in opposed relation at the lower portions of my lifter. Rods 73 engage the middle bales to prevent falling of the middle bales when they are gripped by projecting members 71 and 72.

My lifter is mounted on the lifting forks of tractor 68 which are not shown here. Ram 70 is connected to the hydraulic take-off from tractor 68 and actuates members 74 which are drawn together by ram 70. As members 74 are drawn together, they pull 71 and 72 together since members 74 are pivotally mounted on members 71 and 72 at pivot points 75. Members 71 and 72 are pivotally mounted to a rigid frame 76 at pivot points 77 for pivoting about an axis which is substantially upright.

Figure 7:
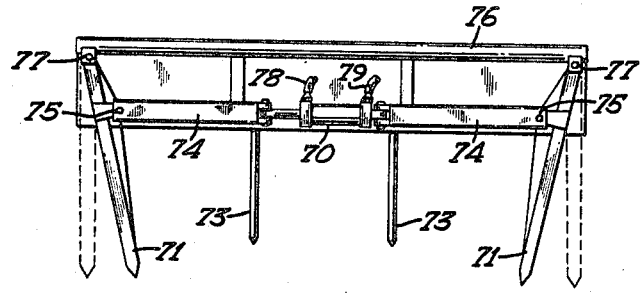
FIG. 7 is a plan view of the bale stack lifting device shown in solid lines in position adapted to engage a stack, and in dotted lines about to receive a stack.

Referring to FIG. 7, bale engaging lifters 71 are shown in the solid lines in the position adapted to engage and secure bales during the lifting action. It should be noted that cylinder 70 is serviced by hydraulic lines 78 and 79, respectively, to provide a reversing action of cylinder 70 such that arms 71 may be positioned as shown in the dotted lines of FIG. 7. Link members 74 are shown drawn together thereby pulling arms 71 inwardly by the action of members 74 pulling inwardly at pivot point 75. This action positively grips the stable bale stack to load the bales on a transport vehicle.

From the foregoing it will be seen that I have provided a bale accumulator which accumulates bales into a stable group, discharging the stable group, automatically, onto the ground for subsequent lifting onto a transport vehicle. My bale accumulator is conveniently pulled by a tractor behind a baler or may be towed by a self-propelled baler. When the accumulator is towed by a tractor, with the baler intermediate the tractor and accumulator, the lifting device may be attached to the front lifting forks of the tractor. This provides a complete unit allowing an operator to not only bale and accumulate bales into stable groups, but also to lift the bales onto a transport vehicle as desired. This may be done without the need for a second piece of equipment or modification, by the operator, of the single vehicle or tractor which he is using to pull the bales and accumulate bales.

Of particular importance in accumulating bales is the control mechanism. I have provided a control mechanism which is comprised primarily of levers which are actuated by bales. Since my controls are basically mechanical linkages with springs as needed to return the linkages after being actuated by a bale, maintenance is at a minimum. When operating the accumulator in an atmosphere of fine dust and airborne particles, it is particularly important that a reliable control system be utilized. Electrically controlled systems have a tendency, in a dusty atmosphere, to fail in that contact is not always positive in dusty conditions. A single hydraulic ram forces the bales transversely across the bale receiving bed and is actuated by mechanical linkages which respond to the incoming bales. The hydraulic system is a closed system thereby providing a power system which is not only fast, but not affected by the dusty atmosphere.

It will, of course, be understood that various changes may be made in the form, details, arrangements and proportions of the various parts without departing from the scope of my invention.

What is claimed is:

1. A bale accumulator adapted to receive bales of a predetermined size for assembly into a stable group and to discharge the stable group for subsequent handling, said bale accumulator comprising
   a frame having wheels rotatably mounted thereon and including means adapted to connect said frame to a towing vehicle,
   a generally horizontally disposed bale receiving bed tiltably mounted on said frame for tilting about an axis generally transverse to the direction of travel of said bale accumulator, said bale receiving bed adapted to receive bales forwardly of the bale receiving bed and discharge bales rearwardly of the bale receiving bed,
   means adapted to receive at least one bale at a time onto said receiving bed and positioning the bale with the longitudinal axis of the bale substantially parallel with the direction of travel of said bale accumulator,
   means advancing an accumulated bale transversely of the direction of travel of said bale accumulator one bale's width to permit receipt of a subsequent bale onto said bale receiving bed, the subsequent bale adapted to be advanced transversely of the direction of travel of said accumulator one bale's width to permit receipt of a next bale, each of the bales being advanced a bale's width, the second contacting and advancing the first received bale, each bale being maintained by said bale advancing means in the position received onto said receiving bed with the longitudinal axis of the bale substantially parallel with the direction of travel of said bale accumulator,
   first mechanical control means operably connected to said bale advancing means whereby a bale received onto said bale receiving bed actuates said first mechanical control means whereby said means advancing bales at least one bale's width is actuated,
   mechanical lever means responsive to a predetermined group of bales received onto said bale receiving bed, said mechanical lever means operably connected to said first control means whereby said first control means is disengaged after a predetermined number of bales have been received onto said bale receiving bed thereby suspending action of said means advancing bales,
   second mechanical control means positioned in response to said mechanical lever means, said second mechanical control means positioned to contact the last bale received onto said bale receiving bed,
   means tilting said bale receiving bed operably connected to said second mechanical control means and responsive to said second control means whereby contact of the last bale with said second control means actuates said means tilting said bale receiving bed thereby permitting said bale receiving bed to tilt and discharge the predetermined stable group of bales from said bale receiving bed.

2. The bale accumulator of claim 1 wherein
   said bale receiving bed is adapted to receive bales stacked at least two high thereon,
   said means receiving at least one bale at a time onto said receiving bed includes means receiving a second bale positioned on top of the first received bale, and including
   means advancing bales in groups of at least two bales stacked one on the other transversely of the direction of travel of said bale accumulator one bale's width to permit receipt of subsequent bales stacked one upon the other before being advanced a bale's width, the bales stacked with their longitudinal axes disposed substantially parallel with the direction of travel of said bale accumulator.

3. The bale accumulator of claim 1 wherein
   said bale receiving bed includes a substantially upright forward wall having an opening therein disposed at one side thereof adapted to receive bales through the opening, the forward wall disposed substantially transversely to the direction of travel of said bale accumulator, an upright side wall positioned substantially normal relative to the forward upright wall and positioned at the end of said bale receiving bed opposite the end of said bale receiving bed adapted to receive bales, and a bale receiving guide secured to the bed of said receiving bed substantially parallel with the direction of travel of said bale accumulator and adapted to align received bales at the point of receipt on said bale receiving bed with the longitudinal axis of the received bale substantially parallel with the direction of travel of said bale accumulator.

4. The bale accumulator of claim 1 wherein said means advancing bales comprises,
   a bale engaging push plate adapted to advance received bales transversely one bale's width, said push plate mounted on said frame for transverse movement thereon,
   an hydraulic ram pivotally connected, at the cylinder end, to said frame and at the piston end, pivotally connected to said bale engaging push plate,
   hydraulic ram control means operably connected with said first mechanical control means whereby a bale received onto said bale receiving bed actuates said first control means thereby initiating said bale advancing means, and
   means connecting said hydraulic ram to a suitable source of hydraulic fluid under pressure.

5. The bale accumulator of claim 4 wherein said means advancing received bales further includes
   a double acting hydraulic ram connected to a suitable source of hydraulic fluid under pressure, and
   control means interposed in the hydraulic connection between said hydraulic ram and suitable source of hydraulic fluid, said control means responsive to said first mechanical control means whereby a bale received onto said bale receiving bed actuates said mechanical control means thereby initiating flow of hydraulic fluid through said hydraulic ram control means and into said double acting hydraulic ram thereby advancing the bale engaging push plate and controlling the flow of hydraulic fluid through said reversible ram to permit return of the bale engaging push plate to position to receive a subsequent bale.

6. The bale accumulator of claim 1 including means returning said mechanical lever means into position to receive, and act in response to, a subsequent group of bales, said means returning said mechanical lever into bale receiving position after a prior group of bales has been discharged from said bale receiving bed.

References Cited
UNITED STATES PATENTS

| | | | |
|---|---|---|---|
| 3,139,196 | 6/1964 | Legocki | 214—6 |
| 3,159,287 | 12/1964 | Stroup | 214—6 |
| 3,163,302 | 12/1964 | Pridgeon | 214—6 |
| 3,251,485 | 5/1966 | Fancher | 214—6 |

ROBERT G. SHERIDAN, *Primary Examiner.*

R. J. SPAR, *Assistant Examiner.*